United States Patent [19]

Everts et al.

[11] Patent Number: 5,950,276
[45] Date of Patent: Sep. 14, 1999

[54] BLOWER AND ADJUSTABLE BLOWER NOZZLE ATTACHMENT

[75] Inventors: Robert G. Everts, Chandler; Kenneth M. Brazell, Phoenix, both of Ariz.

[73] Assignee: Ryobi North America, Inc., Anderson, S.C.

[21] Appl. No.: 09/034,097

[22] Filed: Mar. 3, 1998

[51] Int. Cl.[6] ........................................... A47L 5/14
[52] U.S. Cl. ................................ 15/405; 15/339; 15/418
[58] Field of Search ............................ 15/405, 418, 415.1

[56] References Cited

U.S. PATENT DOCUMENTS

| D. 382,683 | 8/1997 | Henke et al. . | |
|---|---|---|---|
| D. 399,104 | 10/1998 | Sutliff et al. . | |
| 2,827,060 | 3/1958 | Marty | 15/405 X |
| 3,003,706 | 10/1961 | Thorne . | |
| 4,097,722 | 6/1978 | Soler et al. . | |
| 4,118,826 | 10/1978 | Kaeser | 15/405 X |
| 4,718,140 | 1/1988 | Johnson | 15/405 X |
| 5,107,566 | 4/1992 | Schmidt | 15/405 X |
| 5,535,479 | 7/1996 | Pink et al. . | |
| 5,661,910 | 9/1997 | Schepisi . | |
| 5,735,018 | 4/1998 | Gallagher et al. | 15/405 |
| 5,768,749 | 6/1998 | Ohl et al. | 15/405 |
| 5,894,849 | 4/1999 | Ehlhardt et al. | 34/97 X |

Primary Examiner—Chris K. Moore
Attorney, Agent, or Firm—Brooks & Kushman P.C.

[57] ABSTRACT

A hand-held blower and adjustable blower nozzle attachment is disclosed for providing a variable rate air flow discharge from the nozzle attachment. The blower includes a housing having a handle, a discharge portion and a motor with an operatively connected impeller within a chamber connected to the discharge portion. A tubular body is attached to the discharge portion at one end and a blower nozzle attachment at a second end. The blower nozzle attachment includes at least one constrictor flap provided within the nozzle attachment body to change the air flow rate between a low air velocity rate in a first position and a higher air velocity rate in at least one second position. The adjustable blower nozzle attachment is provided with at least one aperture corresponding to the at least one constrictor flap for adjustment of the flap between the first and the at least one second position. A control is rotatably mounted to the nozzle body and includes a member mounted within the nozzle body to return the at least one constrictor flap from the at least one second position to the first position. Alternatively, the control may be slidably mounted to the nozzle attachment body. A member is pivotally connected to both the control and the at least one constrictor flap to move the at least one constrictor flap between the first and the at least one second position.

36 Claims, 6 Drawing Sheets

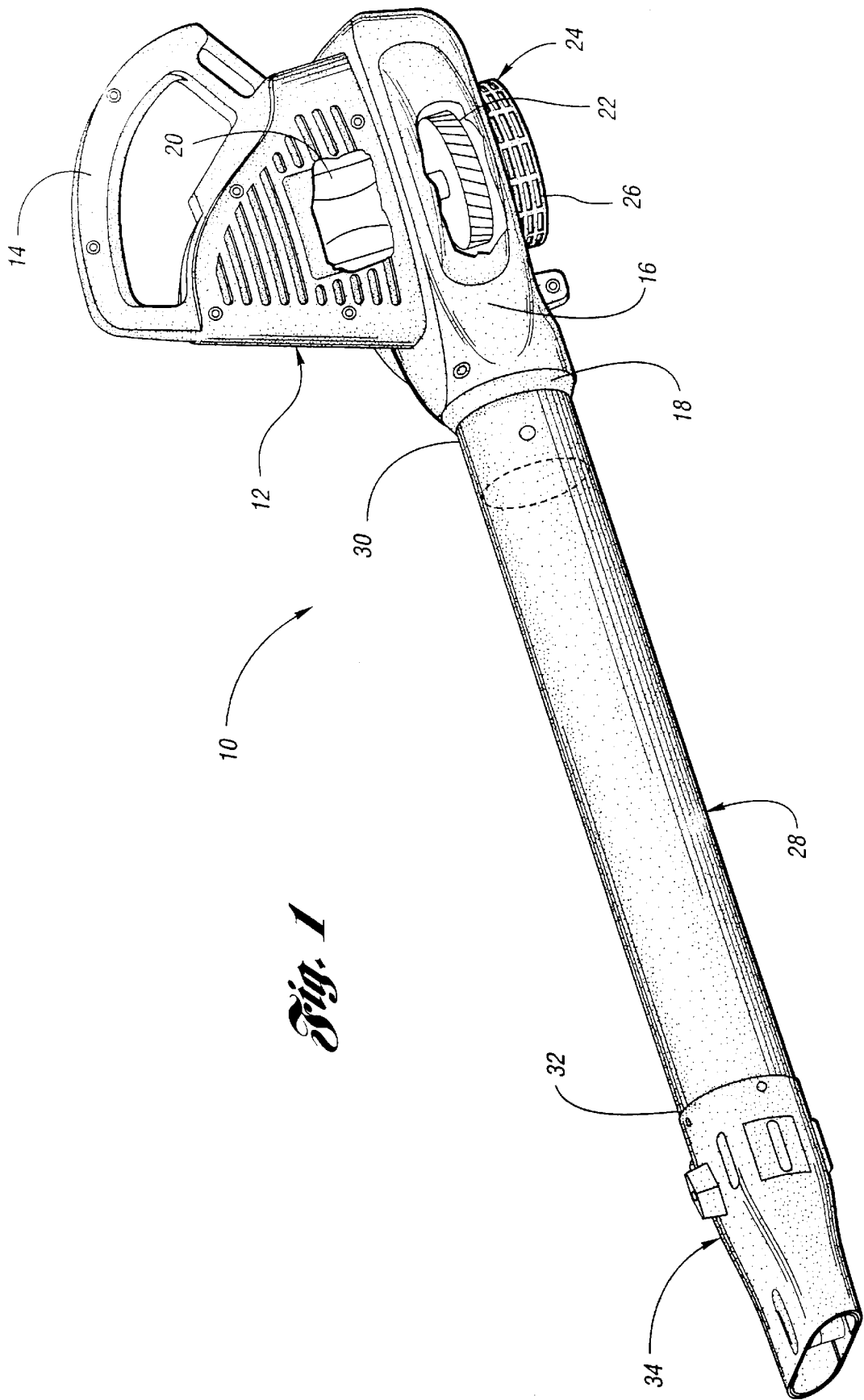

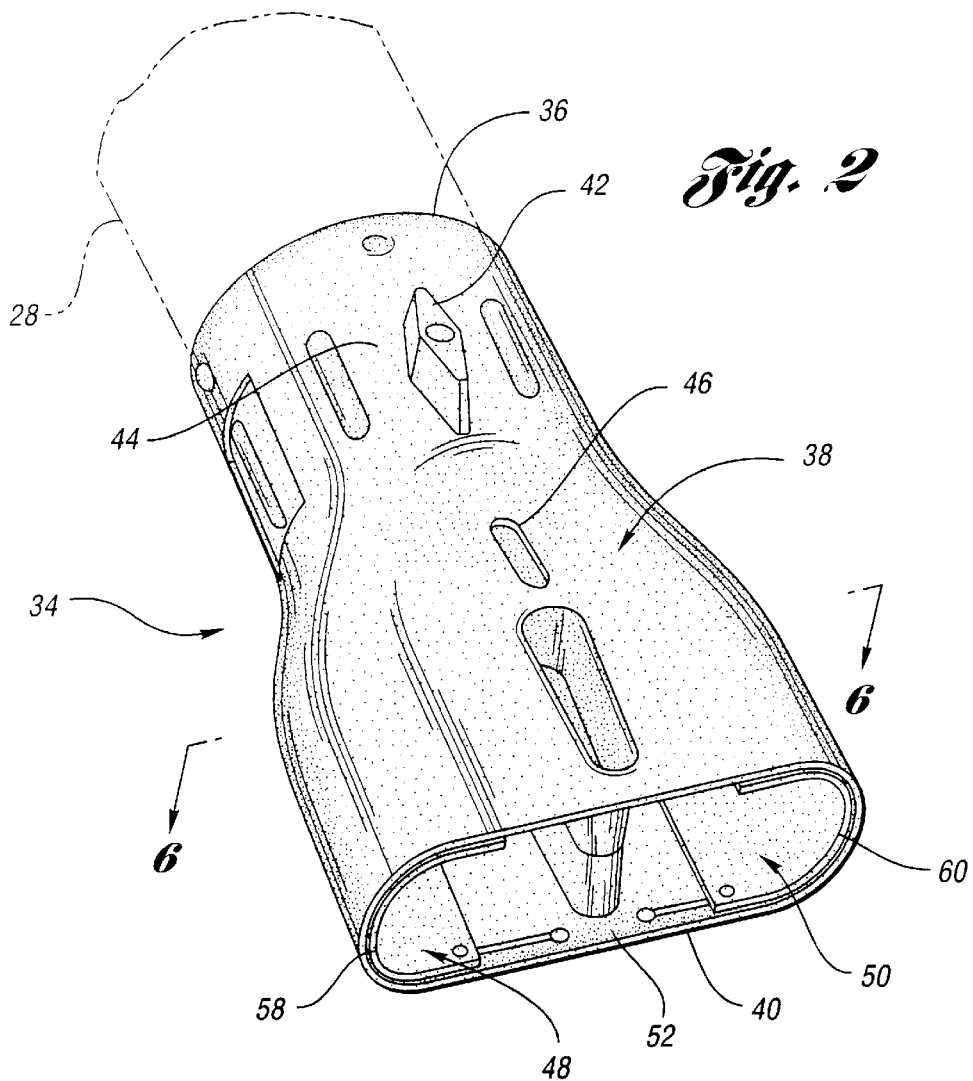

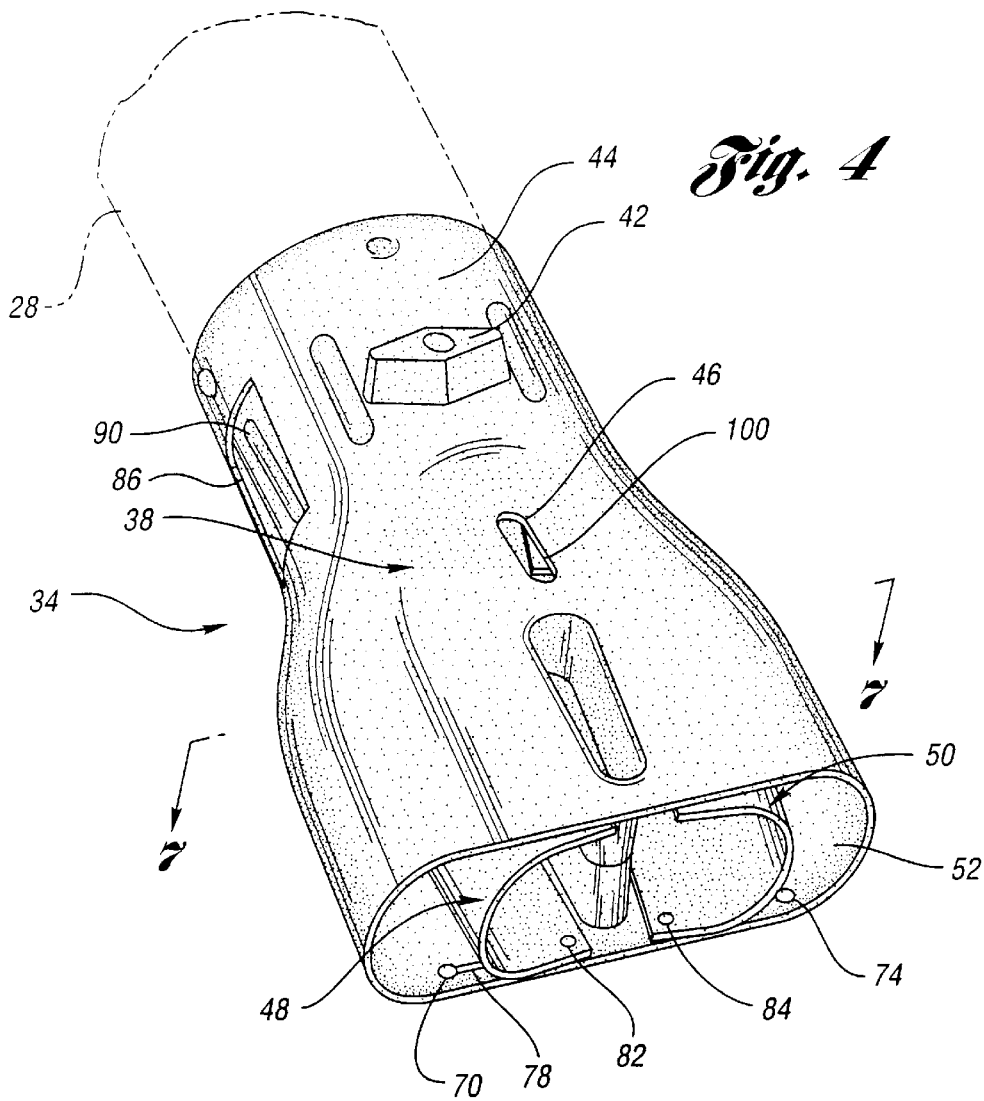
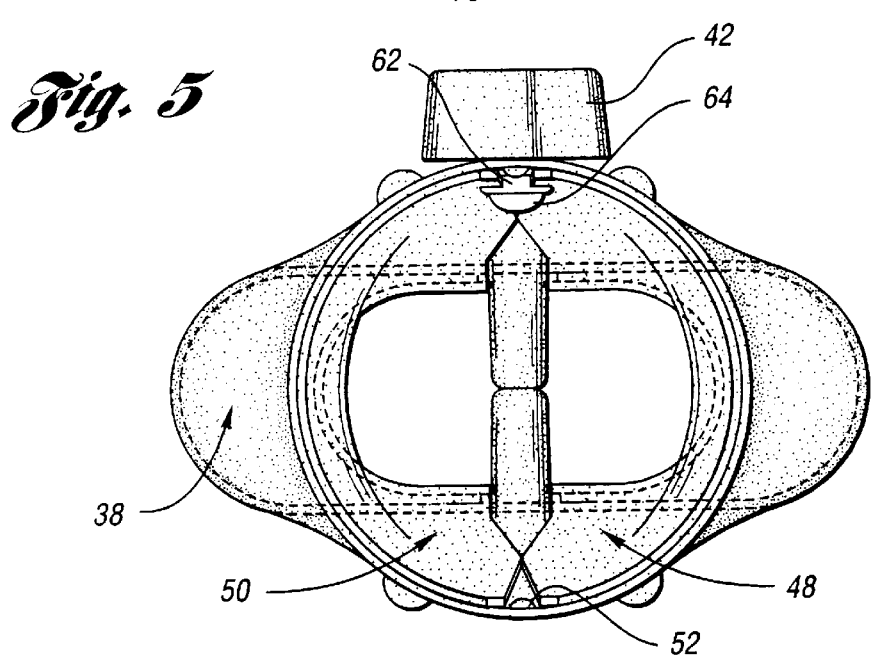

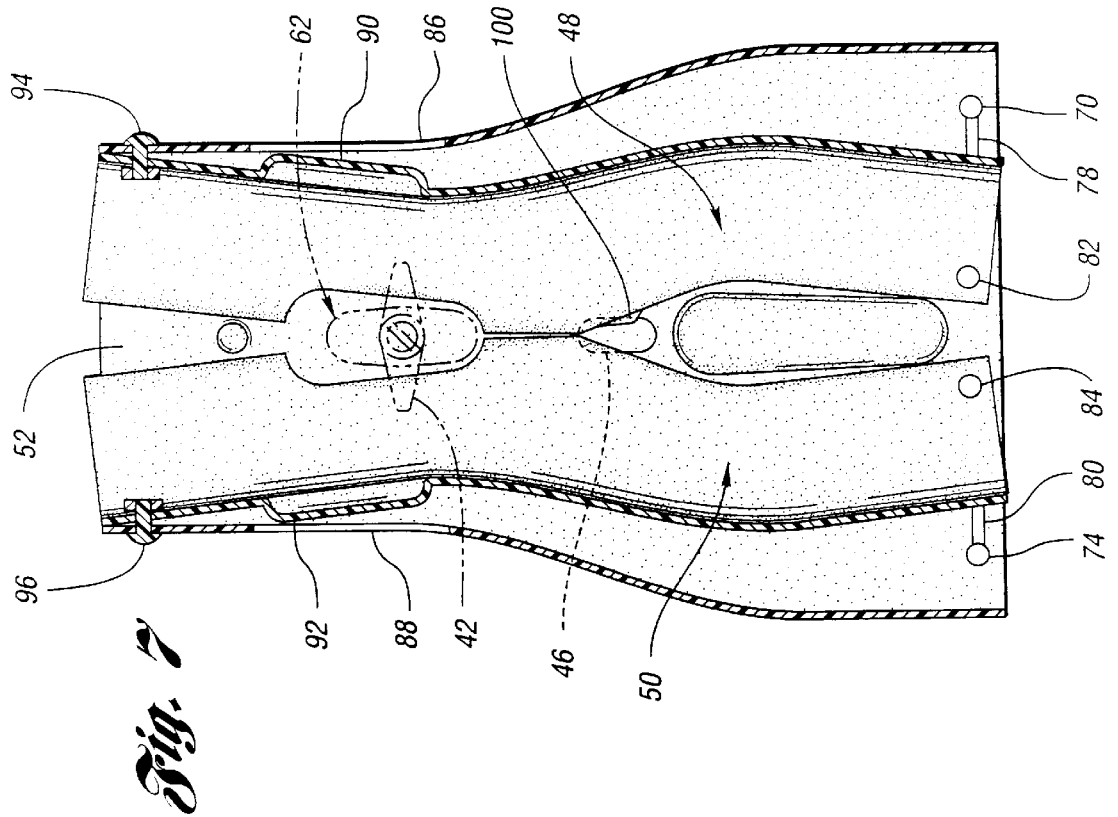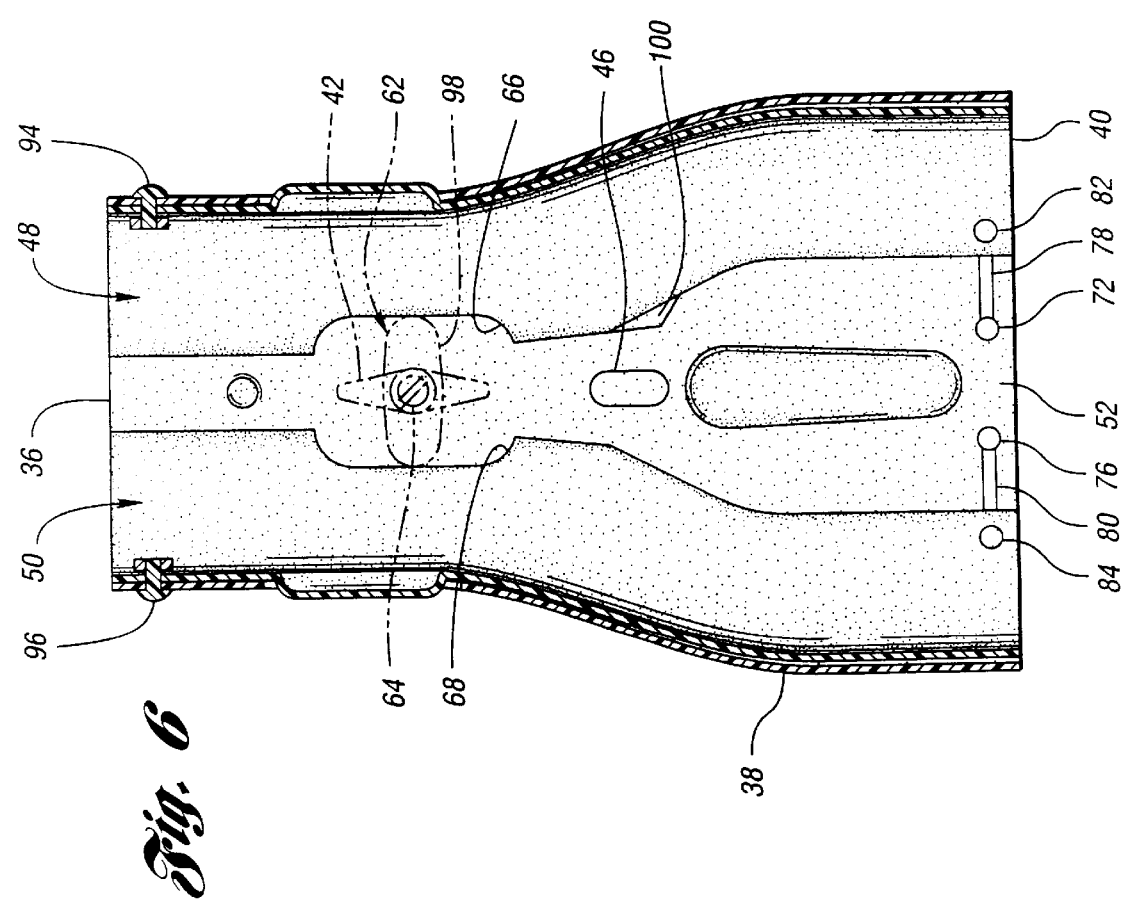

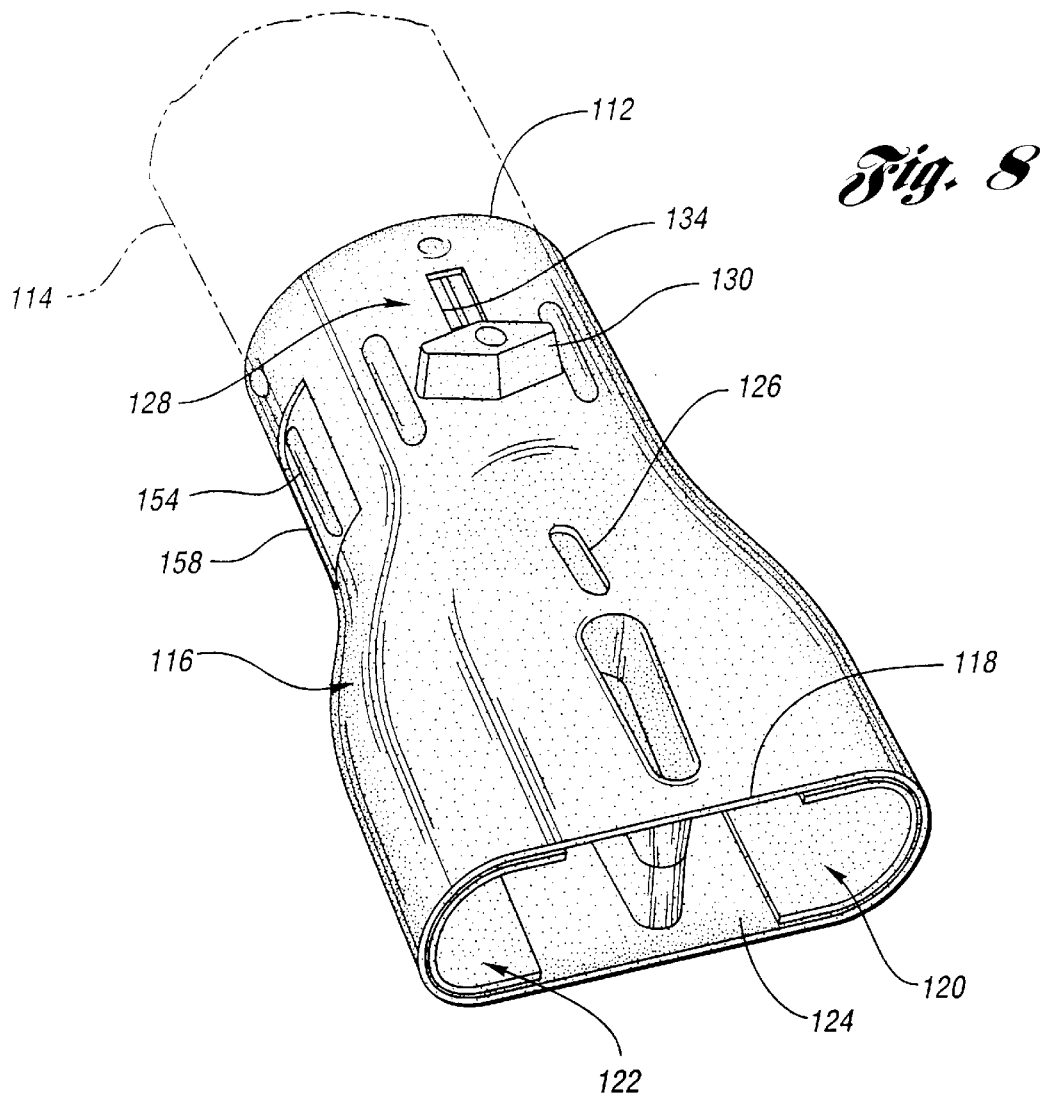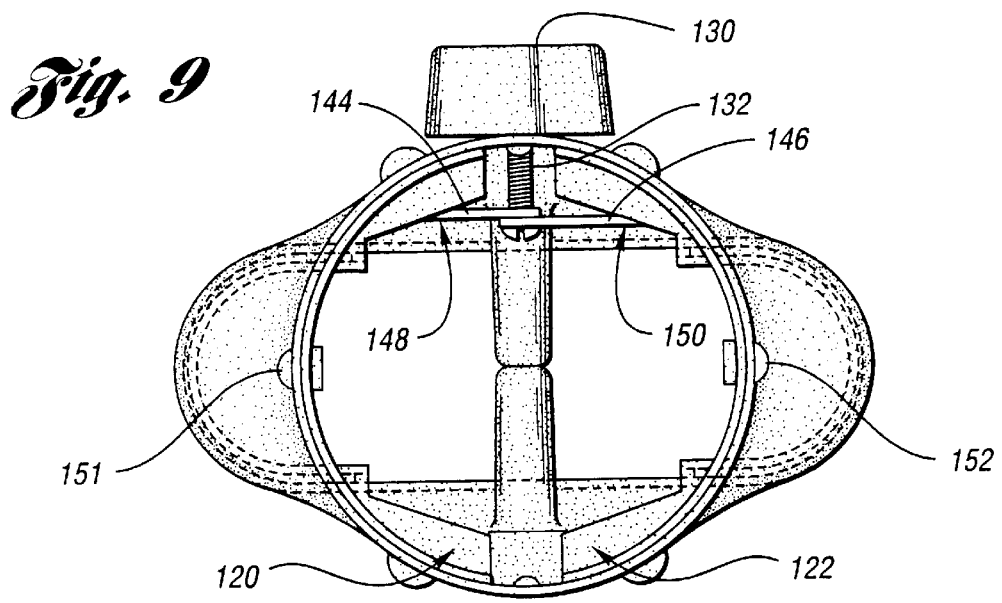

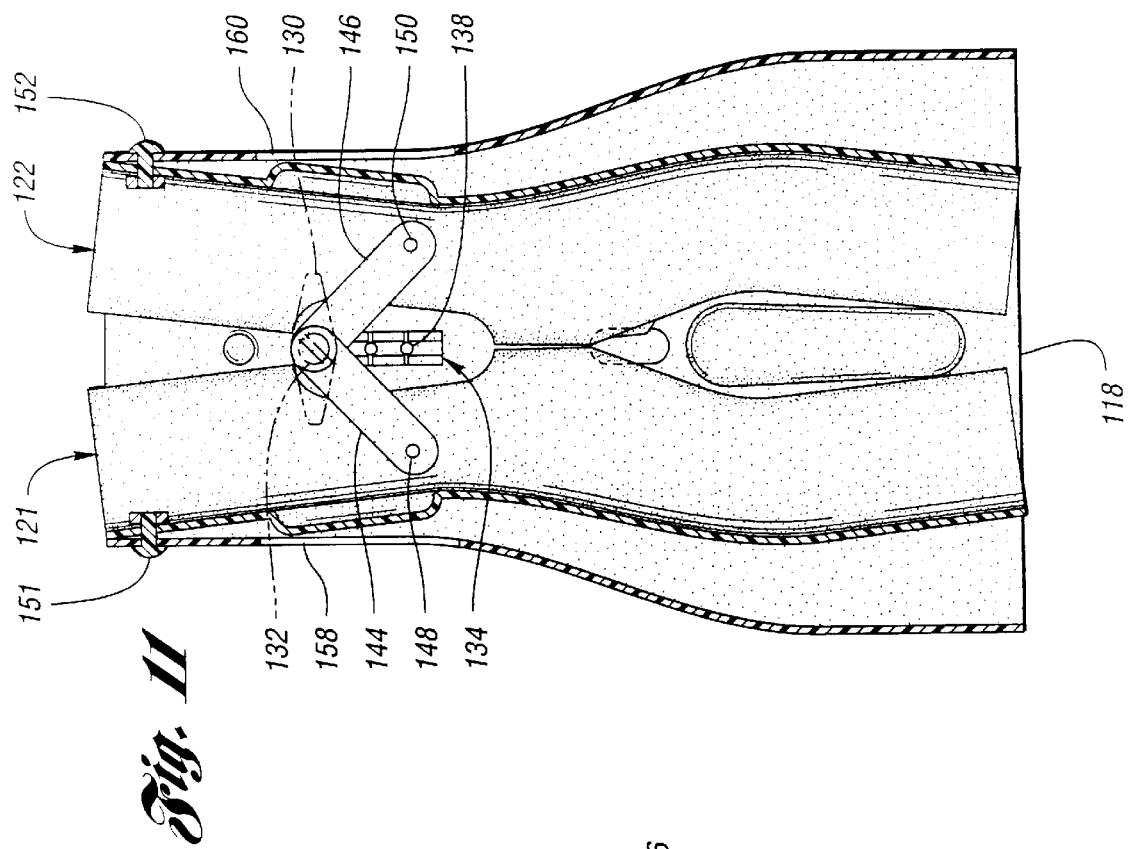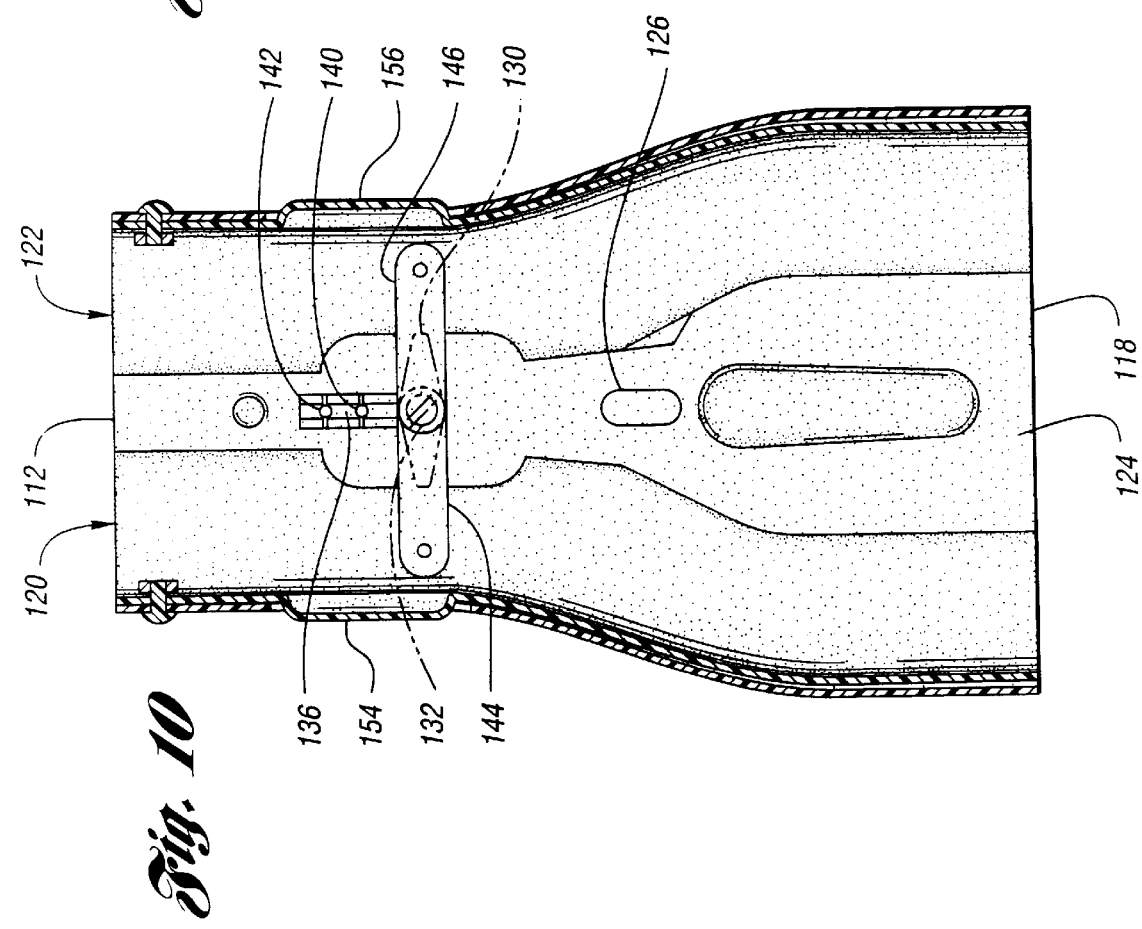

BLOWER AND ADJUSTABLE BLOWER NOZZLE ATTACHMENT

TECHNICAL FIELD

The present invention relates to a hand-held blower and blower nozzle attachment for adjusting the air flow velocity through the blower nozzle assembly.

BACKGROUND ART

Portable hand-held blowers are popularly used by gardeners for home maintenance tasks. These type of a blowers are also used by commercial landscapers, especially for spring and fall clean-up services.

Typical hand-held blowers are either powered by gasoline engines or electric motors. An impeller is connected to the motor or engine and rotates in a chamber within the blower housing. The impeller generates an air flow that is directed towards an outlet port on the blower housing. A tube or pipe is generally connected to the outlet port of the blower housing to direct the air flow from the blower housing to the debris.

It is advantageous for a user to adjust the velocity of the air flow leaving the blower tube for specific jobs. For example, hand-held blowers are of ten used to clear leaves from gutters or wash drains. Air flow velocity exiting the standard tube of the blower is typically not strong enough to remove leaves and debris from the drains.

In order to solve this air flow velocity problem, prior art hand-held blowers have required an operator to use a series of attachments to change the air flow of the blower. Most blowers are provided with a wide angle nozzle attachment for disbursed air flow and a restricted nozzle attachment for providing a directed air flow. These attachments are typically mounted at the exit opening of the tube of the blower.

One of the problems associated with the use of multiple nozzle attachments is that each attachment can provide only one type of air flow velocity. To change between a lower velocity air flow and a higher velocity air flow, an operator has to change the attachment heads from the wide angle nozzle attachment to the directed air flow nozzle attachment. Using the different nozzle attachments to change air flow velocity is inconvenient for the user, as the user must carry both nozzle, attachments in case more than one attachment may be necessary to complete the blowing operation.

Other types of devices have previously adopted the concept of restricting fluid flow through an exit opening. An example of one such prior art device is U.S. Pat. No. 4,097,722 issued to Soler et al. The Soler patent discloses an electric hand-held hair dryer including an air deflecting damper in the exhaust barrel of the hair dryer. The air deflecting damper is operatively positioned between a first position and a second position by a spring biased trigger that extends towards the handle of the hair dryer. The air deflecting damper can only be locked into one of two positions, allowing either a dispersed air flow or a concentrated air flow. The air deflecting damper does not direct the entire air stream towards the exit opening of the dryer. Instead, air escape can flow around the air deflecting damper in the hair dryer nozzle, making the hair dryer less efficient in directing the restricted air flow.

U.S. Pat. No. 3,003,706 issued to Thorne discloses a nozzle attachment for a garden hose. The Thorne patent provides an internally mounted flap that can be adjusted to a variety of positions to allow a user issue a wide, fan-shaped spray or a concentrated spray of water for long distances as desired. The flap is adjusted to a variety of positions by an externally mounted control lever. The lever is operable by the finger or thumb of the user to provide a variety of water velocities. This arrangement requires the user to manually intervene to operate the control lever during the watering operation if a restricted fluid flow is desired.

These and other problems and disadvantages encountered by the prior art are overcome by the present invention as summarized below.

SUMMARY OF THE INVENTION

According to the present invention, a hand-held blower and adjustable blower nozzle attachment are disclosed wherein the blower includes a housing having a handle portion at an upper end of the housing and an air-flow duct at a lower end of the housing opposite the handle. A motor and an impeller operatively connected to the motor are disposed within the blower housing. The impeller generates an air flow within the blower housing that is directed towards an exit opening in the air-flow duct at the lower end of the blower housing. A tubular body is adapted to connect to the air-flow duct portion of the blower housing at a first end to direct the air flow generated by the impeller towards the ground. A second end of the tubular body is adapted to receive the adjustable blower nozzle attachment of the present invention.

The adjustable blower nozzle attachment of the present invention includes a nozzle body having an inlet opening adapted to engage the tubular body at a first end and an outlet opening at a second end. At least one constrictor flap is operatively connected within the nozzle body between the inlet opening and outlet opening. The at least one constrictor flap is movable between a first or open position and a second or restricted position. In the first position, the at least one constrictor flap is set to provide a dispersed air flow. In the second position, the at least one constrictor flap is adjusted to provide a high velocity air flow from the outlet opening. In an alternative embodiment of the invention, the at least one constrictor flap is adjustable to any number of positions between the first or open position and the second or restricted position to provide various air flow rates.

At least one aperture is provided in the nozzle body adjacent the at least one constrictor flap to allow a user to adjust the flaps between the first position and second position. A control is rotatably mounted to an outer portion nozzle body. The control includes a member mounted within the nozzle body to return the at least one constrictor flap from the second position to the first position. Alternatively, the control will adjust the at least one constrictor flap between a first position and a variable second position to provide a variable air flow velocity.

In another embodiment of the invention, the control is slidably mounted to the nozzle body to allow a user to adjust the at least one constrictor flap between a first position and a variable second position to provide a number of different restricted air flow velocities. At least one arm is mounted to the at least one constrictor flap and the control to translate the sliding motion of the control to the at least one constrictor flap to adjust the position of the at least one constrictor flap.

Accordingly, it is an object of the present invention to provide a blower and an adjustable blower nozzle attachment that allows a user to adjust the velocity of the air flow leaving the blower nozzle attachment between a first velocity and a higher second velocity.

It is another object of the present invention to provide an adjustable blower nozzle attachment that can be adjusted to a variety of positions to allow a user to control the air flow velocity leaving the blower nozzle attachment between a first velocity and a series of higher velocities.

These and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of the blower and adjustable blower nozzle attachment of the present invention;

FIG. 2 is a perspective view of the adjustable blower nozzle attachment of the present invention wherein the at least one constrictive flap is positioned in the first or open position;

FIG. 3 is a rear elevational view of the adjustable blower nozzle attachment of the present invention wherein the at least one constrictor flap is positioned in the first or open position;

FIG. 4 is a perspective view of the adjustable blower and blower nozzle attachment of the present invention wherein the at least one constrictor flap is positioned in the second or restricted position;

FIG. 5 is a rear elevational view of the adjustable blower nozzle attachment of the present invention wherein the at least one constrictor flap is positioned in the second or restricted position;

FIG. 6 is a cross-sectional view of the adjustable blower nozzle attachment of the present invention along line 6—6 in FIG. 2 in the first or open position;

FIG. 7 is a cross-sectional view of the adjustable blower nozzle attachment of the present invention along line 7—7 in FIG. 4 in the second or restricted position;

FIG. 8 is a perspective view of a second embodiment of the adjustable blower nozzle attachment of the present invention wherein the at least one constrictor flap is positioned in the first or open position;

FIG. 9 is a rear elevational view of the second embodiment of the adjustable blower nozzle attachment of the present invention wherein the at least one constrictor flap is positioned in the first or open position;

FIG. 10 is a cross-sectional view of the second embodiment of the adjustable blower nozzle attachment of the present invention along line 10—10 in FIG. 8 in the first or open position; and FIG. 11 is a cross-sectional view of the adjustable blower nozzle attachment of the present invention along line 10—10 in FIG. 8 in the second or restricted position.

BEST MODE(S) FOR CARRYING OUT THE INVENTION

Referring now to FIG. 1, the hand-held blower and adjustable blower nozzle attachment assembly of the present invention is illustrated. The blower apparatus 10 includes a housing 12 having a handle portion 14 at the upper rear portion of the housing 12 and an air-flow duct portion 16 at the lower rear portion of the blower housing. A tubular extension 18 is formed as part of housing 12 and extends outwardly from air flow duct portion 16. A motor 20 and an operatively connected impeller 22 are mounted within the blower housing 12. The motor 20 drives impeller 22 to generate an air flow within air flow duct portion 16. Air flow is drawn through an air inlet 24 towards the impeller 22 in the air flow duct portion 16. A cover 26 is provided for the air inlet 24. The cover 26 prevents suction of foreign matter through the air inlet 24 into the air flow duct portion 16 when the blower apparatus 10 is in use.

A tubular body 28 is connected to blower housing 12 to channel air generated by impeller 22 from the tubular extension 18 towards the debris or material to be blown. The tubular body 28 includes a first end 30 that is attached to the tubular extension 18 of blower housing 12, and a second end 32. A set of tabs (not shown) are formed on an inner surface of tubular body 28. The tabs engage a corresponding set of notches, not shown on tubular extension 18 of blower housing 12, to keep the tubular body 28 and the blower housing 12 in a locking engagement.

As is best shown in FIGS. 1 and 2, the adjustable blower nozzle attachment 34 of the present invention is described in greater detail. Nozzle attachment 34 includes an air inlet portion 36, a nozzle body 38 and an air outlet opening 40. A control 42 is mounted to the outer surface 44 of nozzle body 38. As is seen in the preferred embodiment of the nozzle attachment in FIG. 2, the control 42 is rotatably mounted to the outer surface 44 of nozzle body 38. An opening 46 is formed on the upper side of outer surface 44 of nozzle body 38 to provide a visual indication of the status of the nozzle attachment 34. The functionality of opening 46 with regard to the present invention will be described in further detail below.

Referring now to FIGS. 2 and 3, the nozzle. attachment 34 of the present invention is shown in the first or open position. Nozzle attachment 34 includes first and second constrictor flaps 48, 50. First and second constrictor flaps 48, 50 are mounted within the inner surface 52 of nozzle body 38 and are formed to the contour of nozzle body 38 to ensure air flow through the nozzle attachment 34. First and second constrictor flaps 48, 50 include a first portion 54, 56 in cooperation with air inlet portion 36 of nozzle attachment 34 and a second portion 58, 60 in combination with air outlet portion 40 of nozzle attachment 34. Second portions 58, 60 of first and second constrictor flaps 48, 50 in combination with air outlet portion 40 define an exit opening for air flow generated by impeller 22 of blower apparatus 10.

Referring additionally now to FIG. 6, the adjustable blower nozzle attachment 34 of the present invention is shown in the first or open position. Member 62 is rotatably mounted to control 42 by a fastener 64 on the inner surface 52 of nozzle body 38. Member 62 rests between channel portions 66, 68 of first and second constrictor flaps 48, 50. A plurality of detents of 70, 72, 74, 76 are formed on the inner surface 52 of nozzle body 38 nearest air outlet portion 40. Detents 70, 72, 74, 76, are connected via channels 78, 80. Tabs 82, 84 are formed on the second portions 58, 60 of first and second constrictor flaps 48, 50, corresponding to detents 70, 72, 74, 76. Tabs 82, 84 rest in detents 70, 72, 74, 76 while the first and second constrictor flaps 48, 50 are in the first or open position. The combination of tabs 82, 34 and detents 70, 74 aid in keeping the first and second constrictor flaps 48, 50 in a locking engagement with a nozzle attachment 34 during operation.

Referring now to FIGS. 4 and 5, a description of the preferred embodiment of the adjustment of the first and second constrictor flaps from a fixed or open position to a second or restrictive position is discussed in further detail. Apertures 86, 88 are provided in nozzle body 38 to allow user access to first and second constrictor flaps 48, 50. In the preferred embodiment, apertures 86, 88 are diametrically opposed on nozzle body 38 and are adjacent grip portions 90, 92 formed on first and second constrictor flaps 48, 50. To shift the first and second constrictor flaps 48, 50 from the first or open position to the second or restricted position, the user must apply force with a thumb or finger to grip portions 90, 92 of first and second constrictor flaps 48, 50, through apertures 86, 88. Applying this force to first and second constrictor flaps 48, 50, will cause tabs 82, 84 to release from detents 70, 74 on nozzle body 38. After the tabs release from detents 70, 74, the tabs 82, 84 travel along channels 78, 80 towards detents 72, 76. The first and second constrictor flaps 48, 50 pivot about mountings 94, 96 to keep the first and second constrictor flaps 48, 50 in a sealing arrangement with nozzle body 38. As is best seen in FIG. 5, first portions 54, 56 of first and second constrictor flaps 48, 50 form a sealing arrangement with the inner surface 52 of nozzle body 38 to ensure that air flow from the impeller 22 is directed along the walls of first and second constrictor flaps 48, 50 and does not escape around the outer edges of inner surface 52 of nozzle body 38.

The process for moving the first and second constrictor flaps from the second or restricted position back to the first or open position is described in further detail below. Tabs 82, 84 engage detents 72, 76 on the inner surface 52 of nozzle body 38. In the preferred embodiment, a user would rotate control 42 mounted to the outer surface 44 of nozzle body 38, causing member 62 to engage the channel portions 78, 80 of first and second constrictor flaps 48, 50. As the nozzle is rotated, the outer surface 98 of member 62 engages the channel portions 78, 80 causing tabs 82, 84 to release from detents 72, 76. As is seen in FIG. 5, indicating portion 100 of second constrictor flap 50, covers opening 46 and nozzle body 38. In the preferred embodiment, first and second constrictor flaps 48, 50, would be easily distinct from nozzle body 38. In this way, when the first and second constrictor flaps 48, 50 are placed in the second or restrictive position, a user would be able to identify this condition through opening 46 and nozzle body 38.

As control 42 is rotated, outer surface 98 of member 62 continues to apply force to channel portions 66, 68 of first and second constrictor flaps 48, 50. After enough force has been applied to first and second constrictor flaps 48, 50 to cause tabs 82, 84 to release from detents 72, 76 on nozzle body 38, the tabs 82, 84 will travel along channels 78, 80 toward detents 70, 74. The first and second constrictor flaps 48, 50 will lock into a first or open position when tabs 82, 84 engage detents 70, 74.

In another embodiment of the invention, first and second constrictor flaps 48, 50 are adjustable to any number of positions between first detents 70, 74 and second detents 72, 76 to provide a variety of restricted air flow velocities. First and second restrictor flaps 48, 50 are shifted from the first or open position to a restricted position such that tabs 82, 84 travel along channels 78, 80. Tabs 82, 84 and channels 78, 80 create a secure engagement for the first and second constrictor flaps 48, 50 to be held in position during the blowing operation. To return the first and second constrictor flaps 48, 50 to the first or open position, the user rotates control 42 such that member 62 engages the channel portions 66, 68 of first and second constrictor flaps to return the flaps to the first or open position.

Referring now to FIGS. 8–11, a second embodiment of the variable rate blower nozzle assembly is discussed in greater detail. The blower nozzle attachment 110, includes an air inlet portion 112, which is adapted to engage a tubular body 114, a nozzle body 116 and an air outlet portion 118. First and second constrictor flaps 120, 122 are mounted within the inner surface 124 of nozzle body 116. An indicating aperture 126 is provided on the outer surface 128 of nozzle body 116 to allow the operator to determine the position of first and second constrictor flaps 120, 122 during operation.

A control 130 is slidably mounted to nozzle body 116 by fastener 132 in a channel 134 formed in the outer surface 128 of nozzle body 116. A track 136 is provided in channel 134 which is adapted to allow the fastener 123 slide between the ends of channel 134. In the preferred embodiment, track 136 includes a series of stops 138, 140, 142. Stops 138, 140, 142 in track 136 are formed at predefined positions to engage fastener 132 mounted to control 130. The stops 138, 140, 142 lockingly engage fastener 132 to retain first and second constrictor flaps 120, 122 in position during the blowing operation.

Referring now to FIGS. 10 and 11, the adjustment of first and second constrictor flaps 120, 122 from a first or open position to at least one of the restricted positions defined by stops 140, 142 in track 128 is described in greater detail. A pair of arms 144, 146 are rotatably mounted to fastener 132. Arms 144, 146 are connected to first and second constrictor flaps 120, 122 by pins 148, 150. To shift the first and second constrictor flaps 120, 122 from the open position to one of the restricted positions, the operator pulls control 130 towards air inlet portion 112 of adjustable blower nozzle 110. The application of force by the operator to control 122 causes fastener 130 to disengage stop 138 and slide along track 136 in channel 134. As the fastener 134 moves toward stop 140, arms 144, 146 rotate about fastener 134, causing the arms to pull on first and second constrictor flaps 120, 122 at pins 146, 148. The arms 144, 146 make first and second constrictor flaps 120, 122 pivot towards each other about mountings 151, 152.

When fastener 132 reaches stop 140 in track 136, the fastener will engage stop 140, locking first and second constrictor flaps 120, 122 in the restricted position during operation. Alternatively, the operator could move the first and second constrictor flaps 120, 122 from a first position to a restricted position by asserting a force on portions 154, 156 of first and second constrictor flaps 120, 122 extending through apertures 158, 160 of nozzle body 116 to move the fastener 132 from the first stop 138 to the second stop 140 or third stop 142. To return the first and second constrictor flaps 120, 122 to first position defined by stop 138, the operator apply a force to control 130, causing fastener 132 to disengage second stop 140 or third stop 142 and slide down track 136 towards first stop 138.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A blower and nozzle assembly comprising:
 a housing, the housing including a handle portion, an enclosed impeller chamber having an air inlet and a tubular air outlet extending radially outwardly from the impeller chamber;
 a motor disposed within the housing;
 an impeller operatively connected to and rotatably driven by the motor to generate air flow, wherein the impeller is enclosed within the impeller chamber to draw air through the air inlet and discharge the air through the air outlet;

a nozzle body having an inlet opening at a first end and an outlet opening at a second end, the inlet opening cooperating with the tubular air outlet of the housing to receive the discharged air; and at least one constrictor flap received within the nozzle body between the first end and the second end, the at least one constrictor flap movable between a first position and an at least one second position;

wherein the adjustment of the at least one constrictor flap of the nozzle from the first position to the at least one second position adjusts the size of the outlet opening in a first direction to reduce the size of the outlet opening to provide an increased air velocity from the outlet opening, and the adjustment of the size of the outlet opening in a second direction enlarges the size of the outlet opening to provide a decreased air velocity.

2. The blower assembly of claim 1 wherein the at least one constrictor flap and the outlet opening at the second end of the nozzle body cooperate to form an exit opening in the nozzle body.

3. The blower assembly of claim 1 wherein the at least one constrictor flap and the inlet opening of the nozzle body form a seal between the at least one constrictor flap and on inner surface of the nozzle body.

4. The blower assembly of claim 1 wherein the at least one constrictor flap comprises a pair of diametrically opposed constrictor flaps received within the nozzle body.

5. The at least one constrictor flap of claim 4 wherein the pair of diametrically opposed constrictor flaps are pivotally mounted within the nozzle body.

6. The blower assembly of claim 1 wherein at least one aperture is formed in the nozzle body adjacent to the at least one constrictor flap.

7. The at least one aperture of claim 6 wherein the at least one constrictor flap is accessible through the at least one aperture such that the at least one flap can be moved from the first position to the at least one second position.

8. The blower assembly of claim 7 wherein the at least one aperture in communication with the at least one constrictor flap defines a pair of access holes positioned opposite each other on the nozzle body.

9. The blower assembly of claim 1 wherein a control is rotatably mounted to an external portion of the nozzle body.

10. The control of claim 9 wherein the control further comprises at least one member provided within the nozzle body rotatably mounted to the control, wherein the rotational motion of the control is translated to the at least one member such that the at least one member engages the at least one constrictor flap to move the at least one flap from the at least one second position to the first position.

11. The blower assembly of claim 1 wherein the outlet opening at the second end of the nozzle body has a wider diameter than the inlet opening at the first end of the nozzle body.

12. The blower assembly of claim 1 further comprising a tubular body having a first end in cooperation with the associated tubular extension of the air outlet and a second end in cooperation with the inlet opening of the nozzle attachment to transfer air flow generated in the impeller chamber.

13. A nozzle attachment for use in a blower having a motor which generates an air flow, the nozzle attachment comprising:

a nozzle body having an inlet opening at a first end and an outlet opening at a second end; and at least one constrictor flap received within the nozzle body between the first end and the second end, the at least one constrictor flap movable between a first position and an at least one second position having a first portion adapted to form a sealing arrangement with the inner surface of the nozzle body to receive the air flow and a second portion adapted to cooperate with the second end of the nozzle body to form an exit opening;

wherein the adjustment of the at least one constrictor flap from a first position to a second position adjusts the size of the outlet opening in a first direction to reduce the size of the exit opening to provide an increased air velocity from the outlet opening, and the adjustment of the size of the outlet opening in a second direction enlarges the size of the outlet opening to provide a decreased air velocity.

14. The nozzle attachment of claim 13 wherein the at least one constrictor flap comprises a pair of diametrically opposed constrictor flaps received within the nozzle body.

15. The at least one constrictor flap of claim 14 wherein the pair of diametrically opposed constrictor flaps are pivotally mounted within the nozzle body.

16. The at least one constrictor flap of claim 15 wherein the pair of diametrically opposed constrictor flaps are connected such that the pair of constrictor flaps will pivot in unison when moved from the first position to the at least one second position.

17. The nozzle attachment of claim 13 wherein at least one aperture is formed in the nozzle body adjacent to the at least one constrictor flap.

18. The at least one aperture of claim 17 wherein the at least one constrictor flap is accessible through the at least one aperture such that the at least one flap can be moved from the first position to the at least one second position.

19. The nozzle attachment of claim 18 wherein the at least one aperture in communication with the at least one constrictor flap defines a pair of access holes positioned opposite each other on the nozzle body.

20. The nozzle attachment of claim 13 wherein a control is rotatably mounted to an external portion of the nozzle body.

21. The control of claim 20 wherein the control further comprises at least one member provided within the nozzle body rotatably mounted to the control, wherein the rotational motion of the control is translated to the member such that the at least one member engages the at least one constrictor flap to move the at least one flap from the at least one second position to the first position.

22. The nozzle attachment of claim 13 wherein the control is slidably mounted to an external portion of the nozzle body.

23. The control of claim 22 wherein the control further comprises at least one member provided within the nozzle body rotatably connected to the control at a first end and fixably connected to the at least one constrictor flap at a second end, wherein the sliding movement of the control is translated to the at least one constrictor flap such that the at least one flap can be adjusted between the first position and the at least one second position as well as the at least one second position and the first position.

24. The nozzle attachment of claim 13 wherein the nozzle body further comprises at least one detent formed on an inner surface of the outlet opening of the nozzle body.

25. The at least one detent of claim 24 wherein first and second detents are formed on the inner surface of the outlet opening of the nozzle body.

26. The nozzle attachment of claim 13 wherein the at least one constrictor flap further comprises a tab formed on the second portion of the at least one flap corresponding to the at least one detent formed on the inner surface of the outlet opening of the nozzle body.

27. The nozzle attachment of claim 26 wherein the at least one tab formed on the at least one constrictor flap is in communication with one of the first and second detents formed in the nozzle body wherein the at least one tab engages the first detent when the at least one flap is in the first position and the at least one tab engages the second detent when the at least one flap is in the at least one second position.

28. The nozzle attachment of claim 27 wherein a channel connects the first and second detents formed on the nozzle body allowing the at least one tab to move between the first and second detents.

29. The nozzle attachment of claim 13 wherein the nozzle body further comprises an aperture formed in an upper surface of the nozzle body wherein the at least one constrictor flap is viewable through the aperture when the at least one flap is in the at least one second position.

30. The nozzle attachment of claim 13 wherein the second end of the nozzle body defining an outlet opening has a wider diameter than the first end of the nozzle body defining an inlet opening.

31. A nozzle attachment for use in a blower having a motor which generates an air flow, the nozzle attachment comprising:

a nozzle body having an inlet opening at a first end and an outlet opening at a second end;

a pair of diametrically opposed constrictor flaps pivotally mounted within the nozzle body between the first end and the second end, the pair of diametrically opposed constrictor flaps movable between a first position and an at least one second position, wherein the pair of constrictor flaps include a first portion adapted to form a seal between the pair of constrictor flaps and the nozzle body to receive the air flow and a second portion adapted to cooperate with the outlet opening of the nozzle body to form an exit opening;

a pair of diametrically opposed apertures formed in the nozzle body adjacent the pair of diametrically opposed constrictor flaps wherein the flaps are accessible through the apertures such that the flaps can be moved from the first position to a second position;

a control mounted to an external portion of the nozzle body; and at least one member connected to the control to adjust the pair of diametrically opposed constrictor flaps between the first and second positions to adjust the size of the outlet opening in a first direction to reduce the size of the exit opening to provide an increased air velocity from the outlet opening, and the adjustment of the size of the outlet opening in a second direction enlarges the size of the outlet opening to provide a decreased air velocity.

32. The pair of diametrically opposed constrictor flaps of claim 31 wherein the pair of diametrically opposed constrictor flaps are connected such that the pair of constrictor flaps will pivot in unison when moved from the first position to the second position.

33. The pair of diametrically opposed constrictor flaps of claim 31 wherein the pair of diametrically opposed constrictor flaps are connected such that the pair of constrictor flaps will pivot individually when moved from the first position to the at least one second position.

34. The control of claim 33 wherein the control is rotatably mounted to the nozzle body such that the rotational motion of the control is translated to the at least one member to cause the at least one member to engage the pair of diametrically opposed flaps to move the flaps from the second position to the at least one first position.

35. The control of claim 31 wherein the control is slidably mounted to the nozzle body.

36. The control of claim 35 wherein the control further comprises at least one member provided within the nozzle body rotatable connected to the control at a first end and fixably connected to the at least one constrictor flap at a second end, wherein the sliding movement of the control is translated to the at least one constrictor flap such that the at least one flap can be adjusted between the first position and the at least one second position as well as the at least one second position and the first position.

* * * * *